United States Patent
Lee

(10) Patent No.: US 9,438,446 B2
(45) Date of Patent: Sep. 6, 2016

(54) DATA TRANSMISSION DEVICE AND FINANCIAL DEVICE USING SAME

(71) Applicant: LG CNS CO., LTD., Seoul (KR)

(72) Inventor: Hyowook Lee, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 102 days.

(21) Appl. No.: 14/450,817

(22) Filed: Aug. 4, 2014

(65) Prior Publication Data

US 2015/0036700 A1 Feb. 5, 2015

(30) Foreign Application Priority Data

Aug. 2, 2013 (KR) .................. 10-2013-0092026

(51) Int. Cl.

| | |
|---|---|
| *H04J 3/02* | (2006.01) |
| *H04L 12/46* | (2006.01) |
| *G06F 13/38* | (2006.01) |
| *G06Q 20/18* | (2012.01) |
| *G07F 19/00* | (2006.01) |
| *H04L 29/08* | (2006.01) |
| *H04L 12/12* | (2006.01) |

(52) U.S. Cl.
CPC ........... *H04L 12/4633* (2013.01); *G06F 13/38* (2013.01); *G06Q 20/18* (2013.01); *G07F 19/00* (2013.01); *G07F 19/20* (2013.01); *H04L 12/12* (2013.01); *H04L 67/12* (2013.01); *Y02B 60/34* (2013.01)

(58) Field of Classification Search
USPC ....... 370/537, 352, 393, 486, 542, 465, 487, 370/389, 394, 402, 536, 328
See application file for complete search history.

(56) References Cited

U.S. PATENT DOCUMENTS 5,991,410 A * 11/1999 Albert ................ G06Q 20/0855
380/270

FOREIGN PATENT DOCUMENTS

WO WO-2012/110798 A1 8/2012

OTHER PUBLICATIONS

Office Action dated Jul. 17, 2014 in Korean Application No. 10-2013-0092026.

* cited by examiner

*Primary Examiner* — Chi H Pham
*Assistant Examiner* — Alexander O Boakye
(74) *Attorney, Agent, or Firm* — Saliwanchik, Lloyd & Eisenschenk

(57) ABSTRACT

A data transmission device is provided. the data transmission device comprises a first device comprising a first memory; a second device comprising a plurality of sensors, a multiplexer to which data output from the plurality of sensors is input, and a counter connected to the multiplexer; a first transmission line configured to transmit a clock of a signal generator mounted on the first device or the second device to the second device or the first device; a second transmission line configured to transmit data output from the multiplexer according to an output from the counter of the second device to the first memory of the first device; and a third transmission line configured to transmit the output from the counter of the second device to the first device to enable the data transmitted to the first memory of the first device to be stored in a second memory or output.

12 Claims, 3 Drawing Sheets

DATA TRANSMISSION DEVICE AND FINANCIAL DEVICE USING SAME

CROSS-REFERENCES TO RELATED APPLICATION

This application claims the benefit under 35 U.S.C. §119 of Korean Patent Application No. 10-2013-0092026, filed Aug. 2, 2013, which is hereby incorporated by reference in its entirety.

BACKGROUND

Technical Field

The present disclosure relates to a data transmission device for transmitting data by using the least data transmission lines between devices, and a financial device using the same.

In general, a financial device is a device that processes a financial task that a customer wants. The financial device may deposit or withdraw a medium or automatically transfer the medium. As an example, the medium may be paper money or a check.

A general financial device comprises at least two boards. A first board may be called a first device or a main board and a second board may be called a second device or a sub board. For example, a plurality of sensors is connected to the sub board, and data sensed by the sensors is transmitted to the main board by a number of transmission lines corresponding to the number of the sensors. Thus, since many transmission lines are needed, there is a limitation in that a cost increases and there are many breakdowns due to the transmission lines.

BRIEF SUMMARY

Embodiments provide a data transmission device transmitting data through a less number of transmission lines between devices, and a financial device using the same.

Also, embodiments also provide a data transmission device that enables data output from sensors to be transmitted and processed through a less number of transmission lines in a financial device that has many sensors and has to transmit and process signals sensed by the sensors in a narrow space, and a financial device using the same.

In one embodiment, a data transmission device comprises: a first device comprising a first memory; a second device comprising a plurality of sensors, a multiplexer to which data output from the plurality of sensors is input, and a counter connected to the multiplexer; a first transmission line configured to transmit a clock of a signal generator mounted on the first device or the second device to the second device or the first device; a second transmission line configured to transmit data output from the multiplexer according to an output from the counter of the second device to the first memory of the first device; and a third transmission line configured to transmit the output from the counter of the second device to the first device to enable the data transmitted to the first memory of the first device to be stored in a second memory or output.

In another embodiment, a financial device comprising a main board, a sub board, and first to third transmission lines connecting the main board to the sub board, wherein the main board comprises a first memory, the sub board comprises a plurality of sensors, a multiplexer to which data output from the plurality of sensors is input, and a counter connected to the multiplexer, the first transmission line transmits, to the sub board or the main board, a clock of a signal generator mounted on the main board or the sub board, the second transmission line transmits the data output from the multiplexer to the first memory of the main board according to the output from the counter of the sub board, and the third transmission line transmits the output from the counter of the sub board to the main board to enable the data transmitted to the first memory of the main board to be stored in a second memory or output.

In further another embodiment, a data transmission device comprises: a first device; a second device; a first transmission line configured to transmit a clock generated at a predefined interval by a signal generator mounted on the first device or the second device, to the second device or the first device for data transmission between the first device and the second device; a second transmission line configured to transmit data from the second device corresponding to an output signal from a counter mounted on the second device, to a first memory of the first device; and a third transmission line configured to transmit a predefined output signal from the counter to the first device to enable the data stored in the first memory of the first device to be stored in a second memory or output.

The details of one or more embodiments are set forth in the accompanying drawings and the description below. Other features will be apparent from the description and drawings, and from the claims.

DETAILED DESCRIPTION

Figure 1:
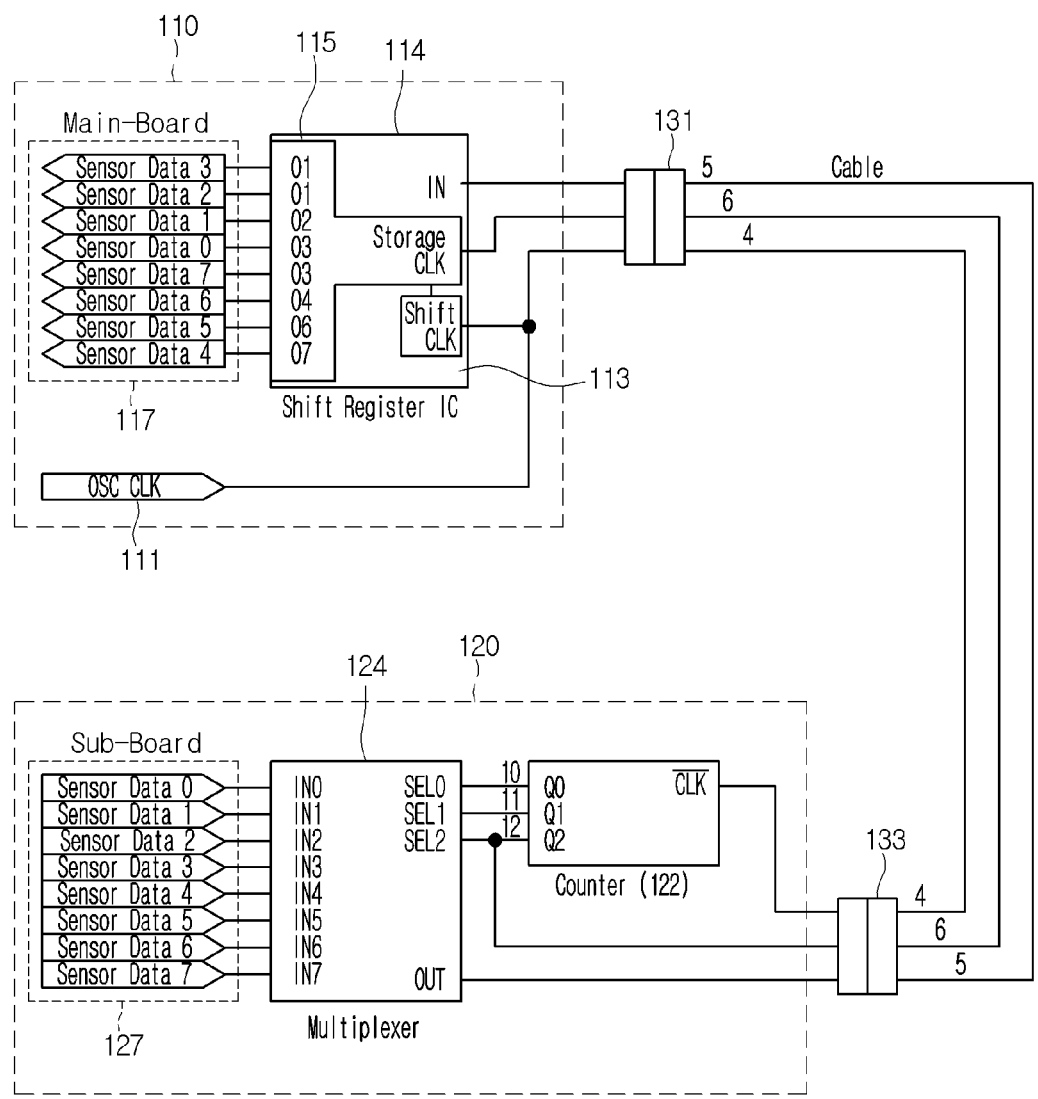
FIG. 1 is a block diagram of a first embodiment that shows two devices performs data transmission.

Some embodiments are described below in detail with reference to exemplary drawings. It should be noted that when adding reference numerals to components of each drawing, the same components have the same numeral if possible even though they are shown in different drawings. Also, in describing embodiments, detailed descriptions of related known configurations or functions are not provided if it is determined that they disturb the understanding of embodiments.

Also, in describing the components of embodiments, the terms first, second, A, B, (a) and (b) may be used. These terms are used only for distinguishing one component from another and do not limit the nature or sequence of corresponding components. When it is described that a component is "connected", "coupled" or "accessed" to another component, it should be understood that the former may be directly connected or accessed to the latter but a third component may also be "connected", "coupled" or "accessed" to between them.

According to an embodiment, a financial device is a device that performs a financial task processing a medium, such as receiving various mediums such as paper money, a stock, giro, a coin and a gift card, processing deposit, giro payment and a gift-card exchange and/or processing withdrawal, giro dispensing or gift-card dispensing. An example of such a financial device may be an automated teller machine (ATM) such as a cash dispenser (CD) or a cash recycling device. However, the financial device is not limited to the examples above and may also be a device that automates a financial task, such as a financial information system (FIS).

In the following, embodiments are described on the assumption that the financial device is the ATM. However, such an assumption is only for the convenience of description and the technical spirit of the present invention is not limited to the ATM.

Figure 2:
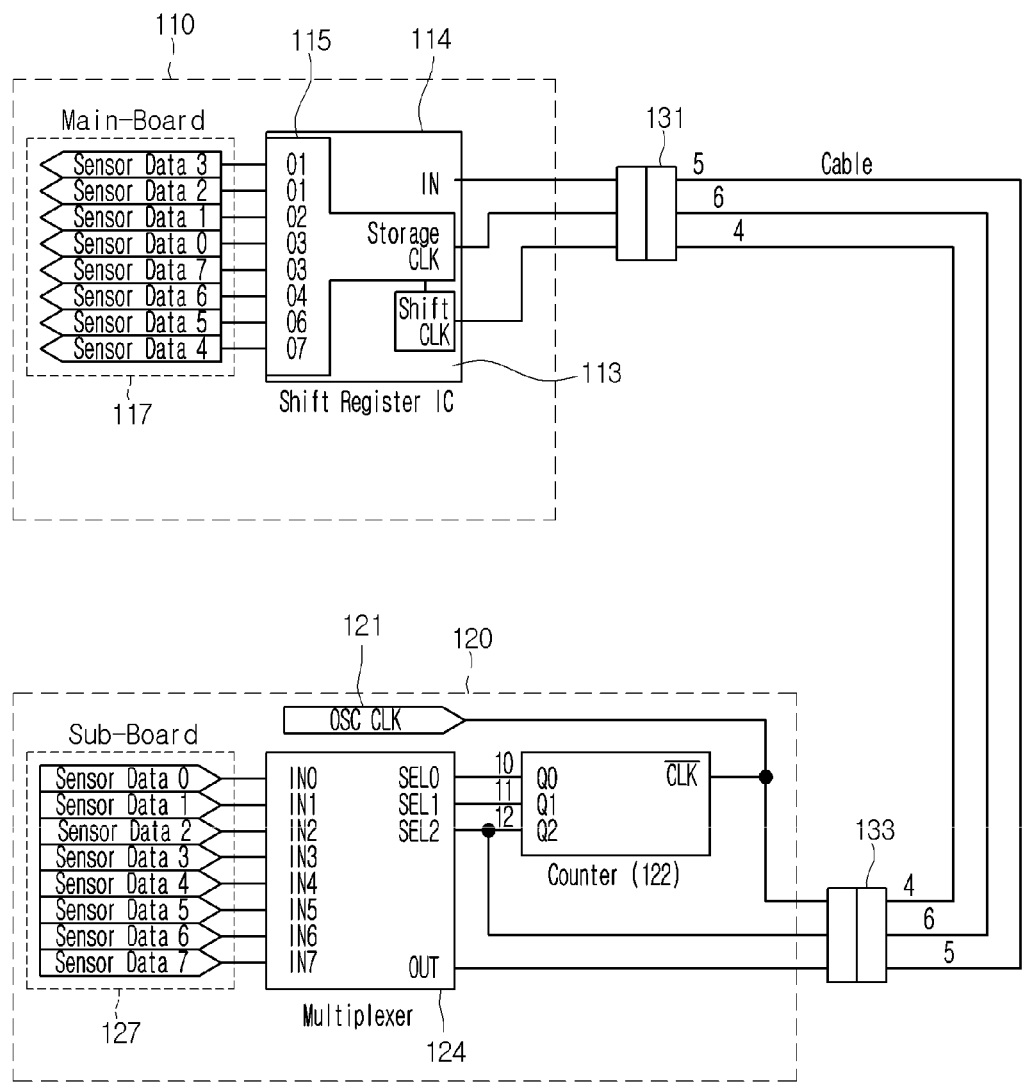
FIG. 2 is a block diagram of a second embodiment that shows two devices performs data transmission.

FIG. 1 is a block diagram of a first embodiment that shows two devices performs data transmission, and FIG. 2 is a block diagram of a second embodiment that shows two devices performs data transmission.

Figure 3:
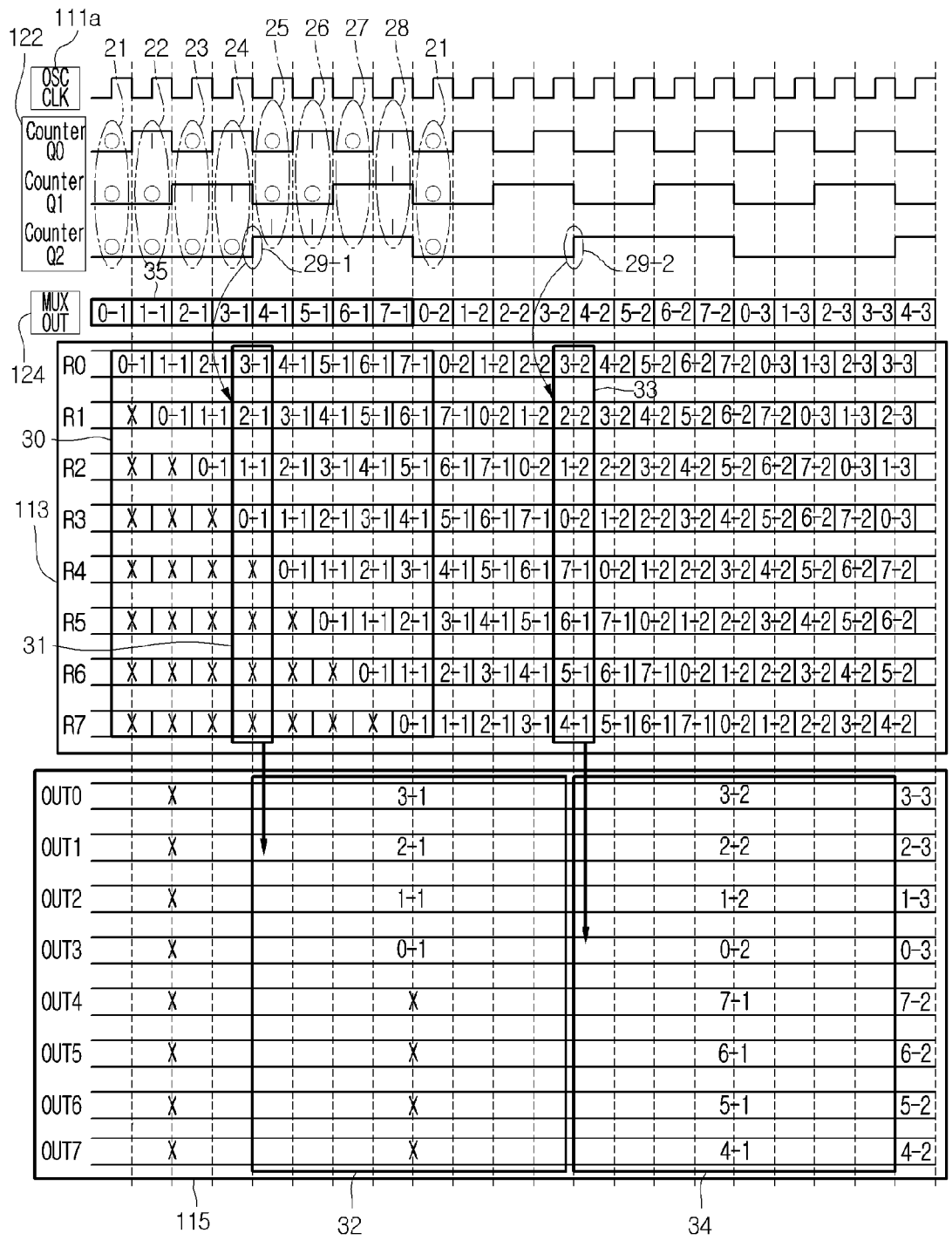
FIG. 3 represents how a data transmission operation is performed between two devices.

FIG. 3 represents how a data transmission operation is performed between two devices.

With reference to FIGS. 1 to 3, embodiments are described below.

As shown in FIGS. 1 and 3, a data transmission device comprises a first device 110 including a plurality of data output units 117; a second device 120 including a plurality of sensors 127; a first transmission line 4 for data transmitting, a clock 111a generated at a predefined interval by a signal generator 111 of the first device 110, to a first memory 113, such as a shift register, of the first device 110 and a counter 122 of the second device 120 for data transmission between the first device 110 and the second device 120; a second transmission line 5 for data transmitting, to the first device 110, any one of sensor data of the second device 120, such as sensor data 0 to sensor data 7 in FIG. 1, corresponding to binary values "000" 21, "001" 22, "010" 23, "011" 24, "100" 25, "101" 26, "110" 27, and "111" 28 according to output signals of the counter 122 of the second device 120, such as output signals Q0 to Q2 from the counter 122 in FIG. 3; and a third transmission line 6 for transmitting the output signal Q2 of the counter 122 at a predefined interval 29-1 or 29-2 (in FIG. 3) of the counter 122 to enable selected sensor data to be transmitted and stored 30 (in FIG. 3) in the first memory 113 so that the selected sensor data is stored 32 (in FIG. 3) in an internal second memory 115, such as storage register, and or is output to another device (not shown).

The signal generator 111 may be mounted on the first device 110 or the second device 120. For example, FIG. 1 shows that the signal generator 111 is mounted on the first device 110 and FIG. 2 shows that the signal generator 121 is mounted on the second device 120.

Referring to FIGS. 2 and 3, a data transmission device comprises a first device 110 including a plurality of data output units 117; a second device 120 including a plurality of sensors 127; a first transmission line 4 for transmitting, a clock 111a generated at a predefined interval by the signal generator 121 of the second device 120, to a first memory 113, such as a shift register, of the first device 110 and a counter 122 of the second device 120 for data transmission between the first device 110 and the second device 120; a second transmission line 5 for transmitting, to the first device 110, any one of sensor data of the second device 120, such as sensor data 0 to sensor data 7 in FIG. 2, corresponding to binary values "000" 21, "001" 22, "010" 23, "011" 24, "100" 25, "101" 26, "110" 27, and "111" 28 according to output signals of the counter 122 of the second device 120, such as output signals Q0 to Q2 from the counter 122 in FIG. 3; and a third transmission line 6 for transmitting the output signal Q2 of the counter 122 at a predefined interval 29-1 or 29-2 (in FIG. 2) of the counter 122 to enable selected sensor data to be transmitted and stored 30 (in FIG. 3) in the first memory 113 so that the selected sensor data is stored 32 (in FIG. 3) in an internal second memory 115, such as storage register, and or is output to another device (not shown).

In the following, descriptions are made with reference to FIGS. 1 and 3 in order to avoid redundancy.

The first device 110 and the second 120 are physically separated and mounted on different locations and there may be access units 131 and 133 to which the first to third transmission lines 4 to 6, between the first device 110 and the second device 120.

The access units 131 and 133 may comprise a first access unit 131 and a second access unit 133. The first access unit 131 may be adjacent to the first device 110 to connect the first to third transmission lines 4 to 6 and the second access unit 133 may be adjacent to the second device 120 to connect the first to third transmission lines 4 to 6.

Also, the first device 110 comprises an oscillator, the signal generator 111 that generates a clock 111a (in FIG. 3) at a predefined interval and outputs the clock to the counter 122 of the second device 120; and a memory unit 114 that receives data from the second device 120. The memory unit 114 may be a shift register IC.

The memory unit 114 may comprise at least one of the first memory 113 (in FIGS. 1 and 3) and the second memory 115 (in FIGS. 1 and 3).

The first memory 113 may receive/store data output from a multiplexer 124 of the second device 120. The multiplexer 124 may output a value corresponding to a binary output value 21 to 28 (in FIG. 3) by the output signals Q0 to Q2 of the counter 122, such as one of sensor data 0 to sensor data 7.

The second memory 115 may receive and store data 31 and 33 stored in the first memory 113. The first memory 113 may transmit the data 31 and 33 stored through synchronization at a predefined timing to the second memory 115. The predefined timing may be the rising timing 29-1 or 29-2 (in FIG. 3) of the most significant bit output signal Q2 of the output signals of the counter 122.

Sensor data corresponding to the output signal of the counter 122 of the second device 120 is received by and stored in the first memory 113 according to the clock 111a of the signal generator 111 transmitted by the first transmission line 4.

The second device 120 may comprise the counter 122 and the multiplexer 124.

The counter 122 may output binary other output values "000", "001", "010", "011", "100", "101", "110", and "111" 21 to 28.

The multiplexer 124 may receive a binary output value from the counter 122 through SEL0 to SEL2 and output sensor data 0 to sensor data 7 corresponding thereto through the second transmission line 5.

As described above, in an embodiment, the counter 122 of the second device 120 operates by the clock 111a of the signal generator 111 of the first device 110, the multiplexer 124 of the second device 120 selects the sensor data 0 to sensor data 7 of each sensor 127 corresponding to the output signals 21 to 28 (in FIG. 3) of the counter 122 to sequentially outputs selected sensor data 35 (in FIG. 3) and transmits the selected sensor data 35 (in FIG. 3) to the first memory 113 of the first device 110. When the clock 111a of the signal generator 111 of the first device 110 and a predefined timing (such as a rising timing 29-1 or 29-2 in FIG. 3) of the output signal Q2 of the output signals of the counter 122 of the second device 120 are transmitted by the third transmission line 6, the sensor data 30 (in FIG. 3) transmitted to the first memory 113 is accordingly stored in the second memory 115. That is, at the rising timing of the output signal Q2 of the counter 122 of the second device 120, the data 31 stored in the first memory 113 is stored as the data 32 of the second memory 115 and maintained until the next rising timing of the output signal Q2. Likewise, at the next rising timing of the output signal Q2, the data 33 stored in the first memory 113 is stored as the data 34 of the second memory 115.

For reference, 0-1, 1-1, 2-1, 3-1, 4-1, 5-1, 6-1, and 7-1 of the outputs of the multiplexer 124 mean first sensor data output by eight sensors, respectively, and outputs 0-2, 1-2, 2-2, 3-2, 4-2, 5-2, 6-2, and 7-2 mean second sensor data output by eight sensors, respectively. In addition, R0, R1, R2, R3, R4, R5, R6, and R7 of the shift register 113 mean individual registers of the first memory 113.

In addition, the operation of an embodiment is described.

The clock 111a of the signal generator 111 of the first device 110 is transmitted to the counter 122 of the second device 120 through the first transmission line 4 and sequentially increases the output values 21 to 28 (in FIG. 3) of the counter 122.

When the outputs 10 to 12 of the counter 122 are input to the multiplexer 124, the multiplexer 124 transmits sensor data 0 to sensor data 7 corresponding to the outputs 10 to 12 of the counter 122 to the first memory 113 of the first device 110 sequentially through the second transmission line 5. For example, when the output value of the counter 122 in FIG. 3 is the binary value "000" 21, the multiplexer 124 outputs sensor data 0, an input value of IN0. Also, when the output value of the counter 122 in FIG. 3 is the binary value "001" 22, the multiplexer 124 outputs sensor data 1, an input value of IN1. In such a manner, the multiplexer 124 outputs sensor data 0 to sensor data 7 according to the output value of the counter 122.

The sensor data 0 to sensor data 7 transmitted in such a manner is stored in the first memory 113 in a shift register IC by the clock 111a of the signal generator 111 of the first device 110, and as the most significant bit output signal Q2 of the outputs of the counter 122 of the second device 120 is transmitted through the third transmission line 6, the data stored in the first memory 113 is stored in the second memory 115.

The clock 111a of the signal generator 111 synchronizes the first memory 113 of the first device 110 with the counter 122 of the second device 120. As shown in FIG. 2, the second device 120 may comprise the signal generator 121.

According to the clock 111a of the signal generator 111, the binary output value of the counter 122 of the second device 120 increases, and sensor data, the output of the multiplexer 124 varying depending thereon is sequentially stored in the first memory 113 in a shift register IC based on the clock 111a of the signal generator 111 transmitted by the first transmission line 4.

The memory unit 114 may be the shift register IC and comprise the first memory 113 and the second memory 115. The first memory 113 stores sensor data transmitted from the second device 120 according to the clock 111a of the signal generator 111. The second memory 115 stores the data of the first memory 113 in synchronization with the most significant bit output signal Q2 of the outputs of the counter 122.

The multiplexer 124 sequentially transmits each sensor data to the first device 110 through the second transmission line 5 according to the outputs 10 to 12 of the counter 122.

The counter 122 increases an output according to the clock 111a of the signal generator 111 transmitted through the first transmission line 4 and each sensor data of the multiplexer 124 is sequentially transmitted to the first device 110 accordingly.

When transmitting data from the second device 120 to the first device 110, a data transmission device according to an embodiment may transmit sensor data by using a less number of transmission lines irrespective of the number of sensors that the second device 120 comprises, as described above. For example, since an embodiment presents an 8-bit device, sensor data is transmitted from eight sensors, but when there is a 16-bit device, it is possible to transmit sensor data from sixteen sensors, even in which case the number of transmission lines do not increase. Sensor data output from sensors that the second device 120 comprises is transmitted to the first device 110 through a transmission line such as a second transmission line 5.

In the data transmission device according to an embodiment, sensors that the second device 120 comprises may be connected to a board of the second device 120 by using a cable. Also, the sensors that the second device 120 comprises may be directly attached to the board of the second device 120 and connected to the multiplexer 124 through a circuit pattern formed on the board without a separate cable. In this case, there is an advantage in that it is possible to further decrease the number of cables.

Also, the first device 110 and the second device 120 may be a main board and a sub board, respectively, and the sensors may be directly mounted on the sub board without a separate cable and connected to the multiplexer 124 through a circuit pattern formed on the sub board. The main board and the sub board are arranged in the housing of a financial device, and data sensed by the sensors is transmitted to the main board through the sub board and processed by the main board.

Also, the sensors of a financial device may comprise at least one of a sensor sensing the opening or closing of a shutter, a sensor sensing the revolution or revolution count of a roller, and a sensor sensing the motion of a guide.

In the data transmission device according to an embodiment, the first device 110 comprises central processing unit (CPU) but the second device 120 does not comprise the CPU. For example, the CPU that the first device 110 comprises may be a device that executes programmed source codes stored in a storage device. Thus, the sensor data output from the sensors that the second device 120 comprises is transmitted to the first device 110 and processed by the CPU that the first device 110 comprises.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Also, although each of all components may be implemented in independent hardware, some or all of components may also be implemented as a computer program having a program module executing some or all of functions that are combined in one or more pieces of hardware through selective combination of some or all of components. Codes and code segments configuring the computer program may be easily inferred by a person skilled in the art. Such a computer program may be stored in a computer readable medium and read and executed by a computer to implement an embodiment. A storage medium for the computer program may comprise a magnetic recording medium, an optical recording medium, and a carrier wave medium.

The above descriptions are only examples of the technical spirit of the present invention, so a person skilled in the art to which the present invention pertains will be able to make various modifications and variations without departing from the nature of the present invention. Thus, embodiments are intended not to limit but to describe the technical spirit of the present invention, and the scope of the technical spirit of the present invention is not limited by such embodiments. The protective scope of the present invention is defined by the appended claims, and all technical spirits within the equivalent scope will be construed as being comprised in the scope of the rights of the present invention.

What is claimed is:

1. A data transmission device comprising: a first device comprising a first memory;
   a second device comprising a plurality of sensors, a multiplexer to which data output from the plurality of sensors is input, and a counter connected to the multiplexer;
   a first transmission line configured to transmit a clock of a signal generator mounted on the first device or the second device to the second device or the first device;
   a second transmission line configured to transmit data output from the multiplexer according to an output from the counter of the second device to the first memory of the first device; and
   a third transmission line configured to transmit the output from the counter of the second device to the first device to enable the data transmitted to the first memory of the first device to be stored in a second memory or output;
   wherein the first device is a main board and the second device is a sub board; and
   wherein the plurality of sensors is connected to the sub board through a cable, or is mounted directly on the sub board and connected to the multiplexer through a circuit pattern formed on the sub board.

2. The data transmission device according to claim 1, wherein the first memory is a shift register.

3. The data transmission device according to claim 1, wherein the second memory is comprised in the first device.

4. The data transmission device according to claim 1, wherein the second memory is a storage register.

5. The data transmission device according to claim 1, wherein the first device further comprises a data output unit connected to the first memory.

6. The data transmission device according to claim 1, wherein the signal generator synchronizes the first device with the second device.

7. The data transmission device according to claim 1, wherein the first device comprises central processing unit (CPU), and the output of the plurality of sensors is transmitted to the first device and processed by the CPU.

8. The data transmission device according to claim 1, wherein the signal generator is mounted on the first device, and the clock of the signal generator is transmitted to the counter of the second device through the first memory and the first transmission line.

9. The data transmission device according to claim 1, wherein the signal generator is mounted on the second device, and the clock of the signal generator is transmitted to the first memory of the first device through the counter and the first transmission line.

10. A financial device comprising a main board, a sub board, and first to third transmission lines connecting the main board to the sub board, wherein the main board comprises a first memory,
    the sub board comprises a plurality of sensors, a multiplexer to which data output from the plurality of sensors is input, and a counter connected to the multiplexer,
    the first transmission line transmits, to the sub board or the main board, a clock of a signal generator mounted on the main board or the sub board,
    the second transmission line transmits the data output from the multiplexer to the first memory of the main board according to the output from the counter of the sub board, and
    the third transmission line transmits the output from the counter of the sub board to the main board to enable the data transmitted to the first memory of the main board to be stored in a second memory or output.

11. The financial device according to claim 10, wherein the plurality of sensors comprises at least one of a sensor sensing the opening or closing of a shutter, a sensor sensing the revolution or revolution count of a roller, and a sensor sensing the motion of a guide.

12. The financial device according to claim 10, wherein the sub board is physically separated from the main board.

* * * * *